Oct. 3, 1967  S. STASENKO ETAL  3,344,986
REGISTER DRIVEN TRANSMITTER
Filed Feb. 7, 1966
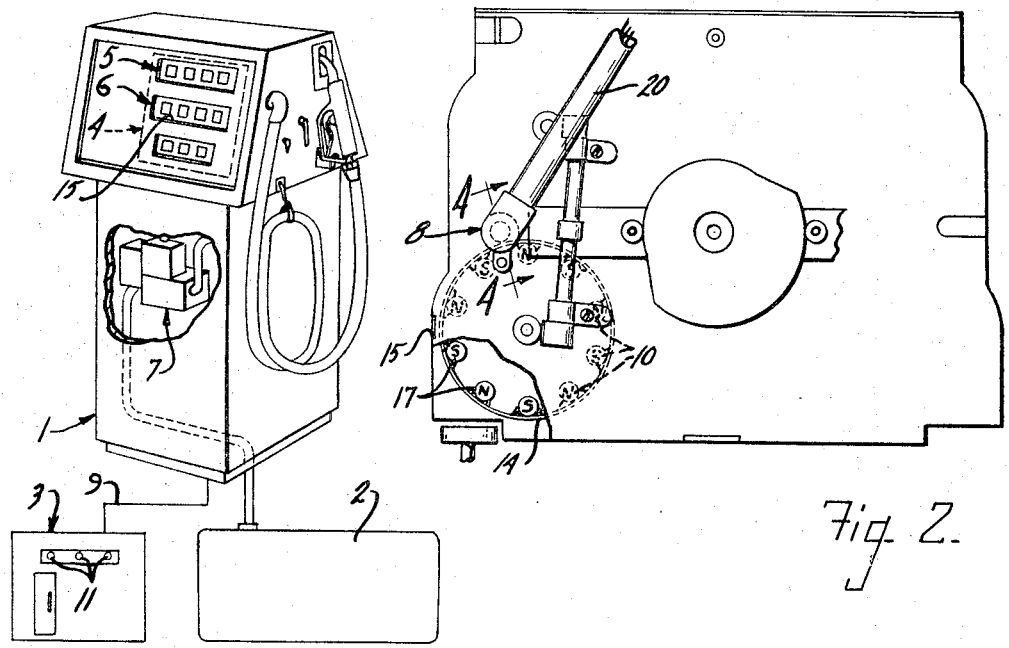
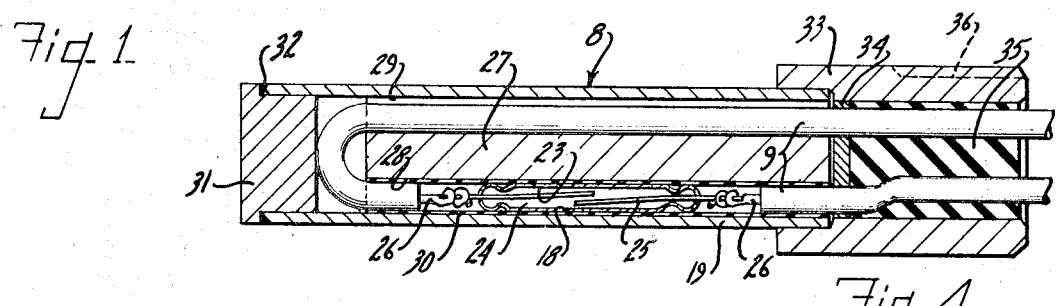
INVENTORS
STEPHEN STASENKO
PAUL T. HERBST
BY
Andrus & Starke
Attorneys

United States Patent Office 3,344,986
Patented Oct. 3, 1967

3,344,986
REGISTER DRIVEN TRANSMITTER
Stephen Stasenko and Paul T. Herbst, Erie, Pa., assignors to A. O. Smith Corporation, Milwaukee, Wis., a corporation of New York
Filed Feb. 7, 1966, Ser. No. 525,473
7 Claims. (Cl. 235—94)

ABSTRACT OF THE DISCLOSURE

A gasoline pump having the usual numerical display digital wheels for gallonage and dollar amounts are cup-shaped and a plurality of equicircumferentially displaced magnet rods are secured to the inner periphery of the tenths gallon wheel. The magnets are aligned with the numerical indicating digits. A reed switch is mounted within the computing mechanism overlying the peripheral surface of the tenths gallon wheel. The contacts of the reed switch extend parallel with the rod magnets. As the pump dispenses, the wheel rotates and the switch is momentarily closed as each magnet moves past the reed switch. The switch is connected into a counting or control circuit.

---

This invention relates to a register driven transmitter and particularly to a transmitter forming an integrated part of the computer or register of a gaoline dispenser or the like for indicating the amount of product dispensed.

In the retail dispensing of gasoline unattended or remotely controlled service pumps have been suggested wherein each delivery is recorded on a suitable temporary or permanent record means. Service stations for retailing of gasoline also include relatively large inventory storage tanks connected to several dispensing pumps. The station operator normally does not desire to have the full amount of inventory because of the required investment. Inventory control systems have been devices in which the several pumps are connected to a dispensing control unit which controls dispensing of gasoline from the bulk storage tanks such that after a prereleased quantity has been dispensed the dispensing system is shut off. Thereafter, the inventory control unit must be reset to release further quantities from the storage tank and reset the dispensing system.

For example, coin, token or credit card operated pumps have been suggested where a printed record of each sale might be desired. Remote readout might be employed in a system having a central office control in combination with a pump operator, such as disclosed in the copending application of Keith N. Shade et al., entitled Remote Control System, filed on the same date as this application and assigned to a common assignee.

In connection with all such transmission systems, it is highly important that a very reliable and accurate means be provided for actuating the indicating or control means in accordance with the actual delivery of the product. A highly satisfactory method of actuating an inventory control or other device is through the establishment of a series of electrical pulse signals in accordance with the actual flow or dispensing from each of the individual pumps. In an inventory control, where several pumps may be simultaneously dispensing the same gasoline, the pulse signals are fed to a discriminator or device to insure that all pulses actuate the inventory control even though two pumps may simultaneously generate pulses. A highly satisfactory way of pulse generation has included intermittent actuation of an electrical switch in accordance with volumetric flow to open and close an electrical circuit in accordance with liquid flow. The train of pulses thus generated provides a direct indication of the total quantity of liquid discharge. The electrical pulse circuit is interconnected in the inventory control to drive it to a disconnect position. However, the provision of a safe and reliable switching system at a reasonable and practical cost presents special problems because of the explosive environment.

In such dispensing of gasoline and like products, the individual dispensers each include a special computer register which provides a visual indication, on suitable counting wheels, of the dollar amount of the sale and the gallonage dispensed, with the former given to the penny and the latter given to the tenth of a gallon. Such computers registers have been highly developed to provide accurate recording of the dispensed quantity and thus provide a source for generating pulse trains related to the actual flow and withdrawal.

The present invention is particularly directed to a reliable accurate means for generating a train of pulses in accordance with the dispensed quantity.

Generally, in accordance with the present invention one of the register wheels, preferably the tenth gallonage wheel or the penny wheel, is provided with a plurality of circumferentially distributed magnets. A magnetically responsive switch is mounted adjacent the wheel and actuated by the magnets as the corresponding wheel rotates. In a highly satisfactory embodiment of the present invention, a plurality of circumferentially spaced magnets were secured to the periphery of the tenth wheel in alignment with the several indicating numbers on the wheel with the magnets polarized axially of the rotating wheel. A small reed switch was mounted adjacent to the periphery of the wheel with the leaf arms of the switch extending parallel to the axis of rotation of the wheel. The reed switch is mounted between two of the digits with the computer reset to zero. As the wheel rotates each magnet actuates the stationary read switch to alternately open and close the switch and thereby produce a train of pulses related to the total quantity delivered for that particular delivery or sale. The magnets being directly attached to the wheel are automatically reset to a proper positioning by the register resetting action to maintain synchronism between the train of pulses and the actual delivery.

The drawing furnished herewith illustrates a preferred construction of the present invention in which the above features and advantages are clearly disclosed as well as others which will be clear from the following description of the embodiment showing in the drawings.

In the drawings:

FIG. 1 is a diagrammatic view of a dispensing system incorporating the present invention;

FIG. 2 is an enlarged side elevational view with parts broken away to show details of construction of the wheel and magnet mounting in the illustrated embodiment of the present invention;

FIG. 3 is a fragmentary front elevational view of the computer showing the mounting of a transmitter assembly as a part of the tenth gallonage wheel in accordance with the present invention;

FIG. 4 is a sectional view of the transmitter taken generally on line 4—4 of FIG. 2.

Referring to the drawings and particularly to FIG. 1, dispensing pump 1 is shown connected to a suitable service station storage tank 2 for the individual withdrawal of gasoline or other stored product from the tank. A remote recording unit 3 is mounted as a part of a suitable station housing or the like and is interconnected into the drive of the dispensing pumps 1 to control the operable connections to the storage tank; for example, as shown in the previously identified copending application of applicant. Each of the dispensing pumps 1 is of any suitable or well-known variety which includes computer and register 4 providing a visual indication of the amount of each delivery on a set of number wheels 5 as well as the individual volume on separate volume indicating wheels 6. The wheels 5 and 6 are coupled through any suitable drive mechanism to a motor pump meter unit 7 of the associated dispensing pump 1 to provide suitable dollar and gallonage indication on the wheels, preferably to the penny and tenth gallon respectively. In accordance with the present invention, a switch unit 8 is mounted adjacent the tenth wheel of the quantity wheels 6 and connected by suitable leads 9 to the inventory control unit 3. A plurality of magnets 10 are equicircumferentially distributed and secured to the tenth wheel 6 to sequentially open and close the switch unit 8 and thereby provide a series or train of electrical pulses to the inventory control unit 3, in accordance with the gasoline dispensed from the related pump 1, the switch unit 8 and magnets 10 from a transmitter assembly. Each of the pulses drives the recording unit 3 to record the amount dispensed. In an inventory control system, unit 3 is coupled to a switch and drives toward a disconnect position such that when a previously released quantity of gasoline has been dispensed, the dispensing system is disabled. The station operator must obtain a coded input to reset the inventory control unit and provide for further withdrawal from the storage tank. This may be through a suitable punched card control having a plurality of inputs 11 requiring selected combinations which change with each actuation. Tokens or any other suitable means may also be employed to set unit 3 to further selected quantities.

Generally, the present invention is directed to the structure of the switch unit 8 and the mounting and location of the operating magnets 10. The dispensing pump 1 and the recording unit 3 may be of any suitable variety and no further description thereof is given other than is clearly necessary to fully describe the operation and structure of the present invention sufficiently to clearly disclose the invention.

Thus referring particularly to FIGS. 1, 2 and 3, the illustrated gasoline pump computer 4 is similar to that constructed and sold by the Veeder-Root Company, Model No. 56, which is of the automatic reset type and more fully described in the service manual of the Veeder-Root Company, for 149700.

In the illustrated computer, each of the wheels 6 is generally a cupped shaped assembly having a central supporting hub 12 rotatably journaled on a shaft 13 and having an outer flange 14 secured to the hub. The indicating digits 0-9 are printed or otherwise applied in equicircumferentially distributed relation on the exterior face of flange 14. Shaft 13 is located to dispose the wheels 6 adjacent a plurality of viewing windows 15 such that one of each of the digits of the gallonage wheels 6 is exposed for visual indication of the gallonage dispensed.

A reset mechanism, not shown, is provided as a part of the computer mechanism and mounted to the opposite side of the computer as shown in FIG. 2 for automatically resetting of the dollar and gallon wheels 5 and 6 to zero prior to each delivery. Although any suitable mechanism may be provided, a highly satisfactory mechanism is that shown in U.S. Patents 2,874,874 and 2,874,875 which were issued to N. Markoff on Feb. 24, 1959, wherein the device includes suitable interlocks such that it must be reset to zero after each delivery is terminated and before a subsequnt delivery can be made. This prevents fraudulent or erroneous overcharging to the customer for any particular delivery.

As previously noted the present invention is particularly directed to the mounting and structure of the transmitter assembly which includes the switch unit 8 and the magnets 10. In accordance with the present invention ten, rod like permanent magnets are provided and are secured to the inside of flange 14, with each one being aligned with one of the reading digits on the outer flange. The magnets 10 are thereby mounted with their axis parallel to the axis of the shaft and therefore the axis of rotation. The magnets 10 can be secured in any suitable manner and are shown secured in place by a suitable adhesive 17, such as an epoxy resin to the inner face of the flange 14. The magnets 10 are polarized axially thereof to dispose a north and south pole at the axial opposite ends thereof. The polarity of adjacent magnets 10 is reversed such that a north pole of the one magnet is aligned with the south poles of the adjacent magnets.

The switch unit 8 is secured to the side wall of the computer and positioned centrally between two adjacent magnets 10.

In the operation of the device the magnets 10 are carried by the tenth wheel 6 past the switch unit 8 and alternately open and close the switch unit 8 accordingly. Each of the magnets being of the reverse polarity with respect to the next one insures positive on-off switch action.

The central location of the switch between two adjacent magnets 10 on the wheel 6 provides maximum accuracy of recording. Thus, the pulses will always be generated essentially half way between the digit marks on the wheels. Further, when the wheels 6 are reset to zero the magnets 10 are properly reset to the starting position with respect to the switch unit 8, and will thereby maintain synchronism with each delivery.

As most clearly shown in FIG. 3, the switch unit 8 of the present invention includes a reed switch 18 mounted within an outer protective tubular housing 19 which is connected to a lead conduit 20 by an elbow mounting member 21. A flange 22 forming a part of the mounting member 21 is bolted or otherwise secured to the side of the computer to properly locate the switch unit 8 with the axis of the switch unit 8 and particularly the reed switch 18 parallel to the rotational axis of the wheel 6.

Reed switch 18 is of a well-known commercially available variety and briefly includes an outer glass tube 23 sealed at the opposite ends and with resilient lead arms or contacts 24 and 25 overlapped within the central portion of the glass tube 20 and extended outwardly through the sealed ends. The contacts 24 and 25 are normally spaced from each other to provide an open circuit. As a magnet 10 moves into alignment with the contacts 24 and 25, the magnet field passes through the contacts and creates a magnetic attraction to close the switch. When the magnet 10 moves from the contacts 24 and 25, they return to the normally open position. The exterior ends of the contacts are connected to stripped ends 26 of the suitable insulated leads 9 which project outwardly from one end of the protective housing 19 and through the mounting member 21 and the conduit 20 and the recording unit 3.

A cylindrical plastic switch and wire insert 27 is closely fitted within the protective housing and includes a pair of diametrically opposite peripheral slots or openings 28 and 29 within one of which the reed switch 18 is disposed. A small protective insulating tube 30 encloses the reed switch 18 and the stripped connection 26 of the insulated leads 9. The peripheral slot 28 of the insert 27 is disposed within the housing 19 to locate switch 18 immediately adjacent the outer surface of the protective housing. One lead 9 projects outwardly from switch 18, the other lead 9 extends around the opposite end of insert 27 and back through the opposite slot 29 such that both leads 9 project outwardly through the one end of the housing 19.

The tubular housing 19 is formed of a suitable stainless steel or the like and is formed open at both ends. A sealing cap 31 preferably formed of brass or the like is brazed at 32 or otherwise secured to the end opposite the exit end for the leads 9. A suitable mounting and sealing assembly is secured to the opposite end of tube 19 and generally includes a brass tube 33 brazed or otherwise secured to the lead end of the housing 19. A washer 34 is mounted within the brass tube 33 immediately adjacent and spaced slightly from the lead end of the housing 19 with the leads 9 passing through suitable openings in the washer. A sealing compound 35 is disposed within and substantially completely fills the brass tube 33 about the leads 26 to provide a hermetically sealed and explosion-proof enclosure of the switch 18.

The outer end of the brass tube 33 is provided with a pair of spaced recesses 36 mating with projections 37 on the inner surface of the elbow mounting member 21 as shown in FIG. 3 for proper locating of the switch unit 8 adjacent the periphery of the wheel 6 and particularly with the reed switch 18 immediately adjacent the periphery of the wheel 6 to provide maximum coupling between the switch and the operating magnets 10.

Thus in operation before a delivery is made the operator must have reset the computer, and particularly the computer or register such that the dollar and volume indicating wheels are reset to zero. In this position the switch unit 8 is located intermediate two adjacent digits and the associated magnets 10. When a delivery is made, the operator actuates the dispensing pump in the usual manner. As delivery is made, the volume and dollar wheels are driven to provide an accurate recording and indication of the delivery. As the volume wheels rotate, and particularly the tenths wheel, the ten circumferentially distributed magnets are sequentially moved past the switch unit 8. As a magnet 10 approaches the reed switch 18, its field is coupled to the switch 18 to close the switch. As the magnet moves from the switch, the field is removed and the switch returns to the normally open position, generating a pulse in the electrical circuit for operating of the inventory control unit. The next succeeding magnet is polarized in an axially opposite direction and the applied field actually reverses as it approaches and moves past the switch 18. Consequently, an interaction of successive fields capable of holding the switch 18 closed as successive magnets move past is prevented and each tenth of a gallon dispensed is recorded. As a result, actuation of the inventory control in accordance with the precise number of revolutions of the column indicating wheel 6 is obtained.

Although the illustrated embodiment of the invention employs the tenth gallonage wheel or register, any other of the wheels 5 or 6 might be employed; for example, the penny wheel of the dollar indicating wheels 5. Further, although illustrated magnet and switch structure provides particular novel and practical unit, other structures might be employed in the broadest aspect of the invention which is directed to employing the present highly developed existing computer indicating elements as an integrated part of a transmitter assembly.

The transmitter of this invention is adapted to existing dispensing pumps and therefor is particularly adapted to commercial exploitation. Further, the explosive-proof mounting of the switch assembly eliminates the necessity for explosion-proof connecting boxes and the like for interconnecting of the transmitter into the transmitting circuit and provides a low cost unit.

Various modes of carrying out the invention are contemplated as being within the scope of the following claims particularly pointing out and distinctly claiming the subject matter which is regarded as the invention.

We claim:
1. A dispenser mounted transmitter, comprising
a computing mechanism having a plurality of flow indicating wheels and resetting mechanism to reset the wheels to a reference position,
a plurality of magnetic members secured to a selected wheel in equicircumferentially spaced relation to each other, adjacent magnetic members being oppositely polarized, and
a magnetically responsive switch means mounted within the dispenser adjacent said selected wheel and located centrally between adjacent magnetic members with the wheel in the reference position.

2. The dispenser control of claim 1, wherein
the switch means includes a reed switch having a pair of overlapping and oppositely extending leaf contacts located parallel to the axis of rotation of the selected wheel, and
each magnetic member is a rod member polarized parallel to the axis of rotation of the selected wheel.

3. A gasoline dispensing unit, comprising
a flow responsive computer having a plurality of rotating amount indicating wheels mounted in spaced alignment adjacent a viewing aperture to produce a visual record of the gasoline flow, each of said wheels being generally cup-shaped with a central mounting opening and an outer annular flange, said computer including means to reset said wheels to a reference display position at the start of each delivery,
a plurality of equally spaced permanent magnet rods secured to the flange of a selected wheel,
an explosion-proof housing,
a switch within said housing,
means to mount said housing adjacent the periphery of the selected wheel and locating said switch generally centrally between adjacent permanent magnets with the wheels in the reference indicating position.

4. The gasoline dispensing unit of claim 3 wherein said rods are secured to the selected wheel by an adhesive.

5. The gasoline dispensing unit of claim 3 wherein said housing is formed of a non-magnetic material, and the switch mounted within the housing includes overlapped and oppositely extending contact arms aligned with the direction of polarization of said permanent magnets.

6. A gasoline dispensing unit, comprising
a flow responsive computer having a plurality of rotating amount indicating wheels including a tenth of a gallon wheel with the wheels mounted in spaced alignment adjacent a viewing aperture to produce a visual record of the gasoline flow, each of said wheels being generally cup-shaped with a central mounting opening and an outer annular flange, and said tenth of a gallon wheel having equicircumferentially spaced digits 0 through 9, inclusive.
said computer including means to reset said wheels to a zero display position at the start of each delivery,
ten permanent magnet rods secured one each to the flange of the tenth of the gallon wheel in alignment with the digits, adjacent magnets being oppositely polarized,
a tubular switch housing formed of a non-magnetic material,
a plastic insert disposed within the housing and having a longitudinal peripheral slot and a longitudinal opening,
a tubular reed switch mounted within the peripheral slot, leads secured to the reed switch and extending outwardly with one lead extending from the slot and the other lead extending back through the opening in the insert,
closure means to close the opposite ends of said housing to form an explosion-proof enclosure of said reed switch, and
means to mount said switch housing adjacent the periphery of the tenth of a gallon wheel with the axis of the housing and the wheels parallel and locating said reed switch generally centrally between adjacent permanent magnets with the wheels in the zero indicating position.

7. The gasoline dispensing unit of claim 6 wherein said closure means includes a sealing cap hermetically sealed to one end and a lead tube hermetically sealed to the opposite end of the housing, a washer within the lead tube having a lead opening, said leads passing through the lead tube, and a sealing compound filling the lead tube about the leads.

References Cited

UNITED STATES PATENTS

| | | | |
|---|---|---|---|
| 1,970,412 | 8/1934 | Bates | 235—91 |
| 3,030,015 | 4/1962 | Wieslander et al. | 235—94 |
| 3,154,672 | 10/1964 | Larkin | 235—91 |
| 3,162,044 | 12/1964 | Lee | 346—33 |
| 3,251,960 | 5/1966 | Peterson | 335—207 |
| 3,268,167 | 8/1966 | Kuhrman | 235—91 |

RICHARD B. WILKINSON, *Primary Examiner.*

STANLEY A. WAL, *Assistant Examiner.*